United States Patent [19]

Tegiacchi et al.

[11] 4,432,801

[45] Feb. 21, 1984

[54] PROCESS FOR CONTROLLED DEGRADATION OF LIQUID GLUCOSE SYRUPS AND CEMENT ADDITIVE PRODUCTS THEREFROM

[75] Inventors: Fabio Tegiacchi; Mario Chiruzzi; Benito Casu; Giangiacomo Torri, all of Milan, Italy

[73] Assignee: Grace Italiana S.p.A., Milan, Italy

[21] Appl. No.: 260,476

[22] Filed: May 4, 1981

[51] Int. Cl.$^3$ .............................................. C04B 7/352
[52] U.S. Cl. ...................................... 106/92; 106/315; 260/687 R; 562/587
[58] Field of Search ........................... 106/90, 92, 315; 260/687 R; 562/587

[56] References Cited

U.S. PATENT DOCUMENTS 4,210,455  7/1980  Metcalf et al. ........................ 106/90

Primary Examiner—James Poer
Attorney, Agent, or Firm—John J. Wasatonic; William L. Baker

[57] ABSTRACT

A process for the controlled degradation of liquid glucose syrups in concentrated solution and in homogeneous phase wherein the reducing groups of glucose, maltose and maltodextrin are converted into the salts of the corresponding aldonic acids and/or into the salts of lower carboxylic acids ($C_1$-$C_4$) without substantially changing the polysaccharide components (degree of polymerization > 3) of maltodextrin, or with only partial depolymerization of the polysaccharide components, by using simple oxidants such as hypohalogenites or ferricyanides, or aqueous alkaline solutions. The conversion of the reducing sugars is equal to or greater than 95%, and a very high reproducibility of the desired results is obtained. The invention also concerns the product obtained by the process and its use as an additive to cement mortars and concretes.

18 Claims, 5 Drawing Figures

Fig. 1 fig.2b

PROCESS FOR CONTROLLED DEGRADATION OF LIQUID GLUCOSE SYRUPS AND CEMENT ADDITIVE PRODUCTS THEREFROM

The present invention concerns a process for the controlled degradation of liquid glucose syrups in concentrated solution.

More particularly, the present invention concerns a process for the controlled degradation of liquid glucose syrups in concentrated solution by eliminating the reducing groups in the mono-, di-, and oligosaccharides.

This invention concerns also the use of the resulting product of the process of this invention as an additive to improve the physical and mechanical characteristics of mortar and concrete.

For the purposes of this description the term "liquid glucose syrup" means the liquid product deriving from the acid and/or enzymatic and/or mixed hydrolysis of starch, obtained from any source such as for example maize, potatoes, rice, wheat, tapioca or other vegetable sources.

Oxidation of the glucose to the corresponding aldonic acid (gluconic acid) is one of the most classical of the chemistry of carbohydrates and is amply described in the literature.

The oxidizers most commonly used for this reaction are the halogens iodine, bromine, chlorine and their derivatives, or the ferricyanides.

Preparation of aldonic acids with chemical methods given in the literature, in subsequent periods, copy in general, even in the details, the methods perfected in preceding periods, in particular those with hypoiodites of Willstätter and Schüdel and of Goebel, and the electrolytic method using bromine of Isbell and Frush. These methods, and in particular the electrolytic method using bromine, have been applied also to disaccharides and oligosaccharides.

Although the abovementioned oxidations proceed in general with relative ease they are not free of disadvantages both in their analytical and preparative application. The chief disadvantages may be summarized thus:

1. The possibility of degradation of the starting compounds under the relatively drastic acidity conditions of the oxidation process using bromine and alkalinity of the processes of oxidation using hypohalogenites.

2. The possibility of overoxidation which leads to the obtention of ketoacids and di- and polycarboxylic acids even if there are still appreciable quantities of reducing carbohydrates present.

Both the aforementioned disadvantages involve incomplete or unreproducible reactions and their minimization requires a search for optimal experimental conditions case by case.

It is known that glucose, maltose and other maltodextrines with molecular weights which are the normal components of liquid glucose syrups can be converted into the corresponding "aldonates" by oxidation of the "reducing" (hemiacetal) groups in accordance with the following diagram:

The oxidation of liquid glucose syrups with hypohalogenites is known from carbohydrate chemistry (e.g. "The halogen oxidation of simple carbohydrates," J. W. Green, Advances in Carbohydrate Chemistry 3, 129, 1948). Nevertheless, on the basis of data in the literature, this oxidation is generally conducted in dilute systems and takes with strong degradation of the nonreducing groups.

It is also known from carbohydrate chemistry (e.g. W. Pigman and L.F.L.J. Anet "Action of acids and bases on carbohydrates," in W. Pigman and D. Horton Ed.s., Vol. IA, p.165, 1972) that the reducing sugars are subjected to rapid degradation in an alkaline solution generating a variety of low molecular weight products according to the following diagram:

The degradation illustrated above proceeds through the formation of highly unstable intermediate ketoenolics and is difficult to control. It usually proceeds even after neutralization of the reaction mixture.

All degradation methods, oxidative or with alkalis, for liquid glucose syrups known from the literature concern, as noted, dilute systems and mainly solution of a single carbohydrate. It was therefore impossible to foresee the results of degradation, oxidative or with alkalis, performed on concentrated systems and consisting of a mixture of different carbohydrates such as those present in commercial liquid glucose syrups.

The fact that uniform results are obtained, i.e. that uniform qualitative and quantitative reaction mixtures of the products of degradation are obtained despite the disadvantages known from the technical literature, is surprising.

The use of commercial liquid glucose syrups as additives for mortars and concretes has been long known. It is also known that the use of these syrups involves serious drawbacks which severely limit their use.

In particular, these syrups have a strong retarding effect on the setting of cement mixes (mortars and concretes). Furthermore, the action of the syrups with a high reducing sugar content is not uniform and is therefore unpredictable. It often happens that the quantity of additive correct for a certain cement is not equally correct for another cement, to the point that hardening may completely fail even if the two cements may be considered of the same type from a commercial viewpoint. This lack of reproducibility is attributed mainly to the presence of weak alkali groups such as, for example, the hemiacetal groups (aldehydo) of the reducing sugars.

Merely as examples, Table I shows the results obtained with three types of commercial liquid glucose syrups having the different weight ratios of monosaccharides, disaccharides and polysaccharides. The disadvantages resulting from the use of these syrups are clear from the compression resistance values of specimens of plastic mortar mainly after 24 hours.

TABLE I

| Sample | Addition rate °/∞ | w/c | Flow mm. | Compressive strength Kg/cm² after: 1 day | 3 days |
|---|---|---|---|---|---|
| Plain | — | 0,5 | 90 | 120 | 274 |
| Liquid glucose syrup with D.E. 43–45 | 1,5 | 0,5 | 98 | 68 | 269 |
| Liquid glucose syrup with D.E. 49–53 | 1,5 | 0,5 | 101 | 67 | 272 |
| Liquid glucose syrup with D.E. 36–37 | 1,5 | 0,5 | 105 | 45 | 258 |

It is certain that the delay in setting of the cement mixes is caused mainly by the simple sugars such as glucose and maltose present in the commercial liquid glucose syrups. The retarding effect is often proportionate to the equivalent dextrose (E.D.) of the syrup.

The retarding effect of commercial liquid glucose syrups as a function of the E.D. value is given in Table II.

The results shown in this table were obtained in accordance with ASTM standards with method C191-77.

TABLE II

| Type of liquid glucose syrup | Addition rate °/∞ on the weight of cement | Initial setting time Hours | Minutes |
|---|---|---|---|
| Plain | — | 2 | 40 |
| D.E. = 36–37 | 1,5°/∞ | 5 | 35 |
| D.E. = 43–45 | 1,5°/∞ | 7 | 5 |
| D.E. = 49–53 | 1,5°/∞ | 7 | 50 |

Table III shows the disadvantages deriving from the use of syrups with increasing E.D. values as additives for mortars and concretes.

TABLE III

| Sample | Addition rate | w/c | Flow mm. | Compressive strength Kg/cm² after: 1 day | 3 days |
| --- | --- | --- | --- | --- | --- |
| Plain | — | 0,5 | 90 | 115 | 259 |
| D.E. 36–38 | 1,5°/₀₀ | 0,5 | 96 | 58 | 253 |
| D.E. 43–45 | 1,5°/₀₀ | 0,5 | 95 | 56 | 249 |
| D.E. 58–60 | 1,5°/₀₀ | 0.5 | 97 | 54 | 240 |

To reduce the delay in setting of cement mixes the use was suggested of starch hydrolyzate (or liquid glucose syrups) having a low E.D. value and a relatively high polysaccharide content (see patent IT 746 936 and patent U.S. 3,432,317). It was nevertheless immediately apparent that these additive compositions still have a considerable retarding effect on the setting of cement mixes so that it was proposed to add hydrosoluble amines (from 0.002 to 0.10%) and chlorides (from 0.005 to 0.90%) see IT 746 936 page 22 and following and claim 7.

In DE-OS 2630799 mainly to avoid the addition of chlorides which corrode the reinforcing rods of cement structures an additive was proposed containing polysaccharides with carboxylic groups having a molecular weight between 400 and 4.000 and a portion of carboxylic groups between 2.5 and 25.0% by weight. The polysaccharides to be used in accordance with the invention may be produced, for example, by oxidative degradation of high molecular weight polysaccharides or by hydrolytic degradation of high molecular weight polysaccharides containing carboxylic groups (see DE-OS 2630 799 page 5 (3) lines 6–13).

The suggested method of the above patent application is, first, uneconomical because the polysaccharides containing in the beginning carboxylic groups such as pectin, alginates, gums, chitin, inoline and so forth can be found in trade at high prices and therefore cannot be used with advantage as starting products in the preparation of additives for cement mixes. In the second place, the entire description fails to show clearly the method to be used for converting the high molecular weight polysaccharides into polysaccharides having carboxylic groups with a molecular weight between 400 and 4.000.

Apart from the fact that it is not possible to repeat experimentally what was described in the above patent application it must be observed that even the abovementioned additives (consisting, as mentioned, of polysaccharides with carboxylic groups having a molecular weight between 400 and 4.000) retard the setting of cement mixes so that it becomes necessary to add accelerators such as, for example, salts of alkaline and alkaline-earth metals, alcanolamines, formates and so forth (see DE-OS 26 30 799, page 7 (5)). The main purpose of this invention is therefore to provide a process easy to apply industrially for the controlled degradation of liquid glucose syrups in concentrated solution and homogeneous phase to convert the hemiacetal groups of the glucose, maltose and maltodextrins into the salts of the corresponding aldonic acids and/or the salts of lower molecular weight carboxylic acids ($C_1$–$C_4$) without substantially modifying the polysaccharidic components (extent of polymerization > 3) of malto-dextrins, or depolymerizing only partially said polysaccharidic components, by the use of simple oxidizer such as, for example, hypohalogenite or ferricyanides or an aqueous alkaline solution, with conversion of reducing sugars equal to or greater than 95% and very high reproducibility of the results, so as to be able to use directly the product derived from said process of controlled degradation as an additive for mortars and concretes.

Another purpose of this invention is to provide an additive for mortars and concretes with uniform quality and capable of giving a very high rate of reproducibility of the results without the need for further additives such as, for example, chlorides, alcanolamines, salts of alkaline metals and alkaline-earth metals.

The intended purposes are reached by the process of controlled degradation in a concentrated solution of liquid glucose syrups and by the product resulting from this process as set forth in the claims enclosed with this description. According to this invention the controlled degradation in a concentrated solution of liquid glucose syrups in homogeneous phase can be accomplished either by oxidation with simple oxidizers, preferably with hypohalogenites, or by treatment with aqueous alkalis.

If oxidation is done with hypohalogenite, in accordance with a presently preferred procedure for conducting the process of this invention, a liquid glucose syrup having an E.D. value between 20 and 85 is treated with an aqueous alkaline solution, preferably of concentrated sodium hydroxide, until a pH of 7.5–10, preferably pH 8.5–9.5, is reached. Then the solution is heated to 40°–60°, preferable 43°–47° C. Then the required quantity of hypohalogenite, preferably hypochlorite (with 10–15% chlorine) is added in between 1 and 3 hours, preferably between 1½ and 2½ hours, maintaining pH constant within ±0.5 points by adding aqueous alkalis, then neutralizing by adding acid.

The course of the controlled degradation process of this invention can be readily followed by IR and NMR spectroscopy as explained below.

According to the presently preferred alternative practice a liquid glucose syrup having an E.D. value between 20 and 85 is treated with an aqueous alkaline solution, preferably of concentrated sodium hydroxide, to bring pH to the desired value between 8.5 and 11.5, preferably between 10.35 and 10.75 or between 11 and 11.5 depending on how it is desired to conduct the reaction, i.e. depending on the weight ratios of the final degradation products it is wished to obtain.

Then the solution is heated to 60°–80° C., preferably 72°–78° C., maintaining temperature and pH within this range by heating or cooling and if necessary adding aqueous alkalis for 50–120 minutes, preferably 55–80 minutes. Then neutralize with acid, preferably concentrated hydrochloric acid.

The course of this alternate method of carrying out the process of this invention may be conveniently followed by NMR spectroscopy as explained below.

When it is desired to reduce the molecular weight of the malto-dextrines present in the liquid glucose syrup to increase the quantity of the final product of degradation it is convenient to carry out a partial preliminary hydrolysis of the maltose and the malto-dextrines by treating the liquid glucose syrup with alkalis at the same pH values but at lower temperatures (20° C.–30° C.) before beginning the controlled degradation process according to this invention.

The liquid glucose syrups useful in the controlled degradation process of this invention have preferably a degree of polymerization between 1 and 10, an E.D. (equivalent dextrose) value above 30 and a maltose content above 10% (dry), preferably above 30%.

For purposes of illustration a list is given below of several types of liquid glucose syrups in trade whose chemical and physical properties are shown in Tables IV-VI:

(A) Liquid glucose syrups from CARGILL:
(1) G 36, (2) G 45, (3) G 58, (4) G 60/2, (5) G 62, (6) G 40/1, (7) CARGILL MALTOSE.

(B) Liquid glucose syrups from SPAD:
(1) 43 S, (2) 45 S, (3) 45 L, (4) 43 F, (5) 45 F, (6) 43 SSP, (7) 46 S, (8) 43 ZS, (9) 45 ZS, (10) 43ZF, (11) 45 ZN, (12) 43 ZAL, (13) 45 ZAL, (14) 43 ADS, (15) 45 ADS.

(C) Liquid glucose syrups from FRAGD:
GLOBE 10500.

Oxidizers useful in the first of the alternate forms of the process of this invention belong to the class of halogen derivatives (chlorine, bromine, and iodine) or the ferricyanides. It is preferable to use hypochlorites, hypobromites and hypoiodites or ferricyanides but hypochlorites are best. Other known oxidizers such as, for example, hydrogen peroxide, may be used but their practical use is limited by the high cost of the oxidizer.

Among the alkaline agents useful in the second alternate form of the process of this invention may be mentioned in particular the aqueous solutions of alkalis such as, for example, sodium hydroxide and potassium hydroxide.

TABLE IV
**PHYSICAL AND CHEMICAL CONSTANTS OF LIQUID GLUCOSE SYRUPS SUPPLIED BY CARGILL(\*)**

| Type of conversion | D.E. | T.S. % | Water content % | pH | ASH % max | Protein (N × 6,25) max % | $SO_2$ ppm | Color (% T 390mm) | Average composition of total solid % | | Viscosity cps | °C. |
|---|---|---|---|---|---|---|---|---|---|---|---|---|
| 1. Acidic | 36,0–39,0 | 79,0–80,0 | 21,0–20,0 | 4,8–5,2 | 0,4 | 0,08 | max 40 | min 80 | D | 16$^{(1)}$ | 80.000, | 30 |
|  |  |  |  |  |  |  |  |  | M | 12 | 11.000, | 40 |
|  |  |  |  |  |  |  |  |  | Mt | 10 | 4.000, | 50 |
|  |  |  |  |  |  |  |  |  | P | 62 | 1.600, | 60 |
|  |  |  |  |  |  |  |  |  |  |  | 800, | 70 |
| 2. Acidic | 45,0–48,0 | 81,0–82,0 | 19,0–18,0 | 5,0–5,5 | 0,4 | 0,08 | 200–250 | min 80 | D | 22 | 70.000, | 30 |
|  |  |  |  |  |  |  |  |  | M | 15 | 17.000 | 40 |
|  |  |  |  |  |  |  |  |  | Mt | 12 | 5.000 | 50 |
|  |  |  |  |  |  |  |  |  | P | 51 | 2.000 | 60 |
|  |  |  |  |  |  |  |  |  |  |  | 900 | 70 |
| 3. Acidic and enzymatic | 58,0–61,0 | 79,6–80,6 | 20,4–18,4 | 4,8–5,2 | 0,5 | 0,08 | max 20 | min 80 | D | 29 | 14.000 | 30 |
|  |  |  |  |  |  |  |  |  | M | 43 | 3.500 | 40 |
|  |  |  |  |  |  |  |  |  | Mt | 3 | 1,500 | 50 |
|  |  |  |  |  |  |  |  |  | P | 25 | 650 | 60 |
|  |  |  |  |  |  |  |  |  |  |  | 200 | 70 |
| 4. Acidic and enzymatic | 60,0–63,0 | 81,5–82,5 | 18,5–17,5 | 4,8–5,4 | 0,5 | 0,08 | max 20 | min 80 | D | 39 | 27.000 | 30 |
|  |  |  |  |  |  |  |  |  | M | 32 | 9.000 | 40 |
|  |  |  |  |  |  |  |  |  | Mt | 13 | 3.000 | 50 |
|  |  |  |  |  |  |  |  |  | P | 16 | 1.200 | 60 |
|  |  |  |  |  |  |  |  |  |  |  | 500 | 70 |
| 5. Acidic and enzymatic | 62,0–65,0 | 81,8–83,0 | 18,2–17,0 | 4,8–5,4 | 0,5 | 0,08 | 250–350 | min 80 | D | 38 | 32,000 | 30 |
|  |  |  |  |  |  |  |  |  | M | 33 | 6.000 | 40 |
|  |  |  |  |  |  |  |  |  | Mt | 10 | 2.400 | 50 |
|  |  |  |  |  |  |  |  |  | P | 19 | 1.000 | 60 |
|  |  |  |  |  |  |  |  |  |  |  | 450 | 70 ‰ |
| 6. Acidic | 39,5–42,5 | 77,8–78,8 | 22,2–21,2 | 5,2–5,6 | 0,4 | 0,08 | 20 | min 80 | D | 18 | 30.000 | 30 |
|  |  |  |  |  |  |  |  |  | M | 14 | 7.000 | 40 |
|  |  |  |  |  |  |  |  |  | Mt | 12 | 2.300 | 50 |
|  |  |  |  |  |  |  |  |  | P | 56 | 1.100 | 60 |
|  |  |  |  |  |  |  |  |  |  |  | 500 | 70 |
| 7. Acidic and enzymatic | 36,0–39,0 | 78,0–79,0 | 22,0–21,0 | 4,8–5,2 | 0,5 | 0,08 | 20 | min 80 | D | 6 | 20.000 | 30 |
|  |  |  |  |  |  |  |  |  | M | 37 | 7.000 | 40 |
|  |  |  |  |  |  |  |  |  | Mt | 11 | 3.000 | 50 |
|  |  |  |  |  |  |  |  |  | P | 46 | 1.500 | 60 |
|  |  |  |  |  |  |  |  |  |  |  | 700 | 70 |

(\*) CARGILL B.V. Glucose Department, Lelweg 31, 4612 PS BERGEN CP ZOOM Holland
$^{(1)}$ D = Dextrose  M = Maltose  MT = Maltotriose  P = Polisaccharydes

TABLE V
**PHYSICAL AND CHEMICAL CONSTANTS OF LIQUID GLUCOSE SYRUPS SUPPLIED BY S.P.A.D. S.p.A.(\*)**

| | Type of conversion | D.E. | BE' | BRIX | % DX and Malt. | | $SO_2$ | |
|---|---|---|---|---|---|---|---|---|
| (1) | ACIDIC (Continue) | 36–38 | 43 | 81 ± 05 | (14–16) | (16–18) | 50 | ppm |
| (2) | " | " | 45 | 81 ± 1 | " | " | " | " |
| (3) | " | " | 45 | " | " | " | 120–150 | ppm |
| (4) | " | " | 43 | 81 ± 05 | " | " | " | " |
| (5) | " | " | 45 | 85 ± 05 | " | " | " | " |
| (6) | " | 30 | 43 | 81 ± 05 | (12–13) | (15–16) | 50 | ppm |
| (7) | " | 36–38 | 46 | 87 | " | " | " | " |
| (8) | ACIDIC-enzymatic | " | 43 | 81 ± 05 | (8–10) | (25–30) | 50 | ppm |
| (9) | " | " | 45 | 85 ± 05 | " | " | " | " |
| (10) | " | " | 42 | 81 ± 05 | " | " | 120–150 | ppm |

TABLE V-continued
PHYSICAL AND CHEMICAL CONSTANTS OF LIQUID GLUCOSE SYRUPS SUPPLIED BY S.P.A.D. S.p.A.(*)

| Type of conversion | | D.E. | BE' | BRIX | % DX and Malt. | | $SO_2$ |
|---|---|---|---|---|---|---|---|
| (11) | " | " | 45 | 85 ± 1 | " | " | 80-100 ppm |
| (12) | ENZYMATIC | 43–44 | 43 | 81 ± 05 | (4-5) | (50-60) | 50 ppm |
| (13) | " | " | 45 | 85 ± 1 | " | " | " |
| (14) | ACIDIC-enzymatic | 60 ± 2 | 43 | 81 ± 05 | (25-28) | (44-48) | 50 ppm |
| (15) | " | " | 45 | 85 ± 1 | " | " | " |

(*) S.P.A.D. S.p.A. = Società Piemontese Amidi e Derivati, Cassano Spinola, Alessandria.

TABLE VI
PHYSICAL AND CHEMICAL CONSTANTS OF LIQUID GLUCOSE SYRUP GLOBE 10500 F.R.A.G.D. S.p.A.(*)

| | |
|---|---|
| D.E. | 56 ± 2 |
| Be | 43 ± 0,2 |
| Total solids % | 80 ± 0,5 |
| Density Kg/lt | 1,422 |
| pH | 5 ± 0,5 |
| Color | light yellow |
| Average composition of total solid: | |
| Glucose | 28 |
| Maltose | 40 |
| Polysaccharides | 32 |

(*) Fabbriche Riunite Amido Glucosio Destrina S.p.A., Milano.

The following examples illustrate better the process of this invention. They do not constitute a limitation on the protection of this invention because, as will be apparent to the technician of this branch, the methods of carrying out the process of this invention can be varied as concerns the glucose syrups, the reagents, and the reaction conditions to better suit individual circumstances.

EXAMPLE 1

To 30 g of glucose syrup with an E.D. value of 36–39 add an aqueous solution of NaOH at 40% by weight, agitating constantly in a thermostat-controlled bath at 40° C.±5° C. until pH 9 is reached. During this period, approximately 5 minutes, the temperature of the solution rises to approximately 45° C.±5° C. Then in a period of 2 hours add to the above solution 50 ml of sodium hypochlorite at 12% Cl, maintaining pH nearly constant (9±0,5) by automatic addition of 40% NaOH by weight, 6-8 ml of NaOH total. At the end of the reaction the temperature of the solution is approximately 43° C. Then neutralize the reaction mixture by adding 37% HCl. The final volume of the neutralized reaction solution is 85 ml. An IR and NMR spectroscopic check of the reaction solution shows that practically total conversion of the reducing sugars is reached (see FIG. 1a and FIG. 2b).

EXAMPLE 2

Proceed as in Example 1 using a syrup with an E.D. value of 43–45 instead of 36–39. The results obtained are practically equivalent to those of Example 1.

EXAMPLE 3

Proceed as in Example 1 using a glucose syrup with an E.D. value 58–60. The results obtained are practically equivalent to those of Example 1.

EXAMPLE 4

To 30 g of glucose syrup with E.D. 36–39 add 70 ml of water and sufficient 40% NaOH by weight to bring the reaction solution to pH 10.5. After holding the solution for 1 hour approximately at 75° C. cool the mixture and neutralize with 37% hydrochloric acid. An NMR spectroscopic check of the reaction solution (FIG. 2c) shows that practically total conversion of the reducing sugars is reached, indicating that the reaction mixture contains, in addition to the undegraded polysaccharides, the sodium salts of carboxylic acids: formic, acetic, saccharinic and/or arabonic.

EXAMPLE 5

Proceed as in Example 4 except that the pH value of the reaction mixture is 11.25 instead of 10.5. An NMR spectroscopic check of the reaction solution (FIG. 2d) shows that practically total conversion of the reduction sugars is reached, indicating that the reaction mixture contains, in addition to undegraded polysaccharides, the sodium salts of the carboxylic acids: formic, acetic, lactic, saccharinic and/or arabonic.

EXAMPLE 6

Proceed as in Example 4 using a syrup with an E.D. value of 43–45. The results obtained are practically equivalent to those of Example 4.

EXAMPLE 7

Proceed as in Example 5 using a syrup with an E.D. value of 43–45. The results obtained are practically equivalent to those of Example 5.

EXAMPLE 8

Proceed as in Example 4 using a syrup with an E.D. value of 58–60. The results obtained are practically equivalent to those of Example 4.

EXAMPLE 9

Proceed as in Example 5 using a syrup with an E.D. value of 58–60. The results obtained are practically equivalent to those of Example 5.

IR spectroscopic examination of the aldonates produced by oxidation of the glucose syrups with hypohalogenites is based on the principle that the absorption of the carboxylate band at 1,598 cm$^{-1}$ is directly proportional to the concentration of the aldonate groups. Analysis is made in a $D_2O$ solution using sodium gluconate for reference in accordance with the following experimental procedure. 10 ml of the reaction solution are diluted with 50 ml of water. 2 ml of this solution (containing approximately 50 mg of carbohydrate) are evaporated to dryness in a rotary evaporator. The residue is dissolved in 2 ml of $D_2O$ (99.7%). The IR spectrum of the solution is then recorded in the 1,800–1,400 cm$^{-1}$ region in a 0.050 mm $CaF_2$ cell using as reference a similar cell filled with $D_2O$ in the reference beam.

The apparent aldonate content of the solution is calculated from the absorbance at 1,598 cm$^{-1}$ (line-base technique) with reference to a calibration curve obtained with sodium gluconate (1.0 to 4.0% by weight in D$_2$O).

The true aldonate content is obtained taking into account the interference from the sodium formate determined with the NMR method (see below) and with reference to a calibration curve obtained with sodium formate in D$_2$O (0.1–0.5%).

Figure 1:
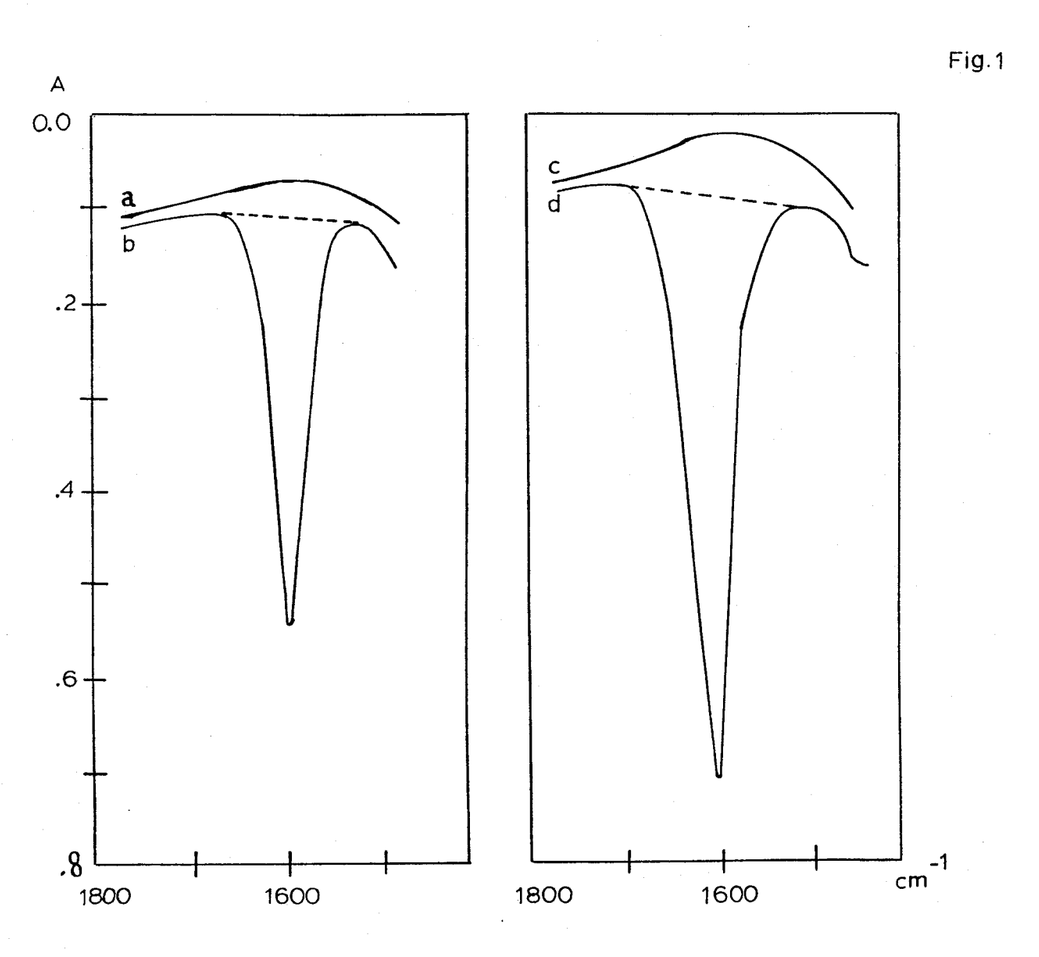
FIGS. 1 and 2a–d show the results of IR and NMR spectropic tests of degraded and undergraded glucose syrups.

As shown in FIG. 1, the glucose (a) and the malto-dextrine (c) do not interfere with the analysis, especially if the absorbance values both in the calibration measurements and the analytical measurements are made with a base line drawn between the highest transmittance points on both sides of the analytical band.

Nuclear magnetic resonance (NMR) analysis of the oxidated glucose syrups is based on the following principle. The magnetic protonic resonance spectra ($^1$H—NMR) of the malto-dextrines in a D$_2$O solution show the characteristic signals attributable to the anomeric protons (H-1) both of the reducing and the nonreducing groups.

Elimination of the reducing groups by oxidation with hypohalogenites or by alkaline degradation involves a substantial increase in the intensity ratio of nonreducing to reducing signals.

In addition, the characteristic signals of the products of oxidation or degradation (aldonates or lower molecular weight carboxylic acids) make it possible to determine the content of these products in the reaction mixture. FIGS. 2a to d show typical spectra.

Figure 2A:
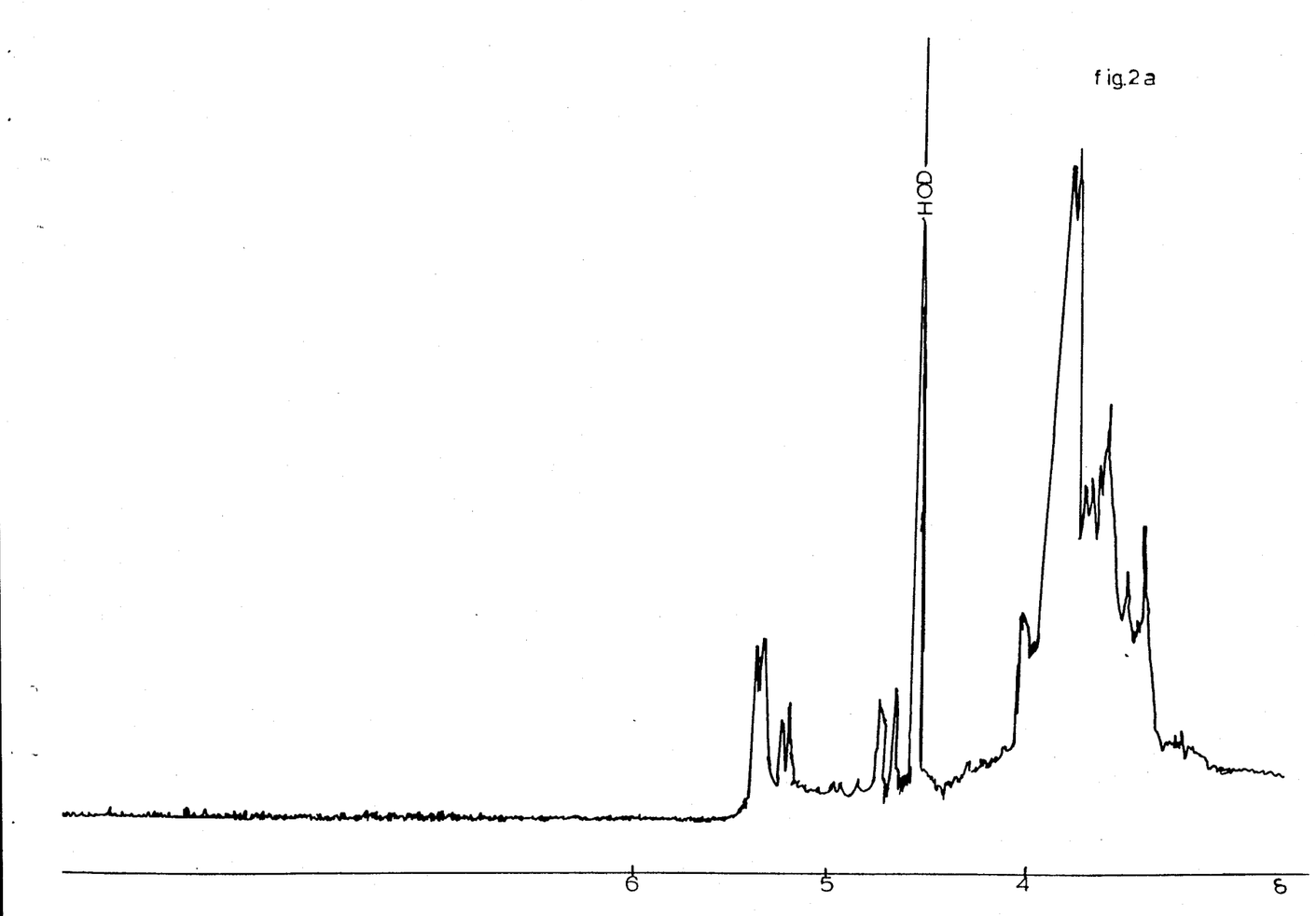

FIG. 2a shows the spectrum of an unmodified glucose syrup. The doublets at 4.66 and 5.24 ppm ($\delta$ from the TSP internal reference standard) are due to H-1 of the reducing groups, respectively in the $\beta$ and $\alpha$ configurations. The doublet at 5.36 $\delta$ is due to H-1 of nonreducing groups.

Figure 2B:
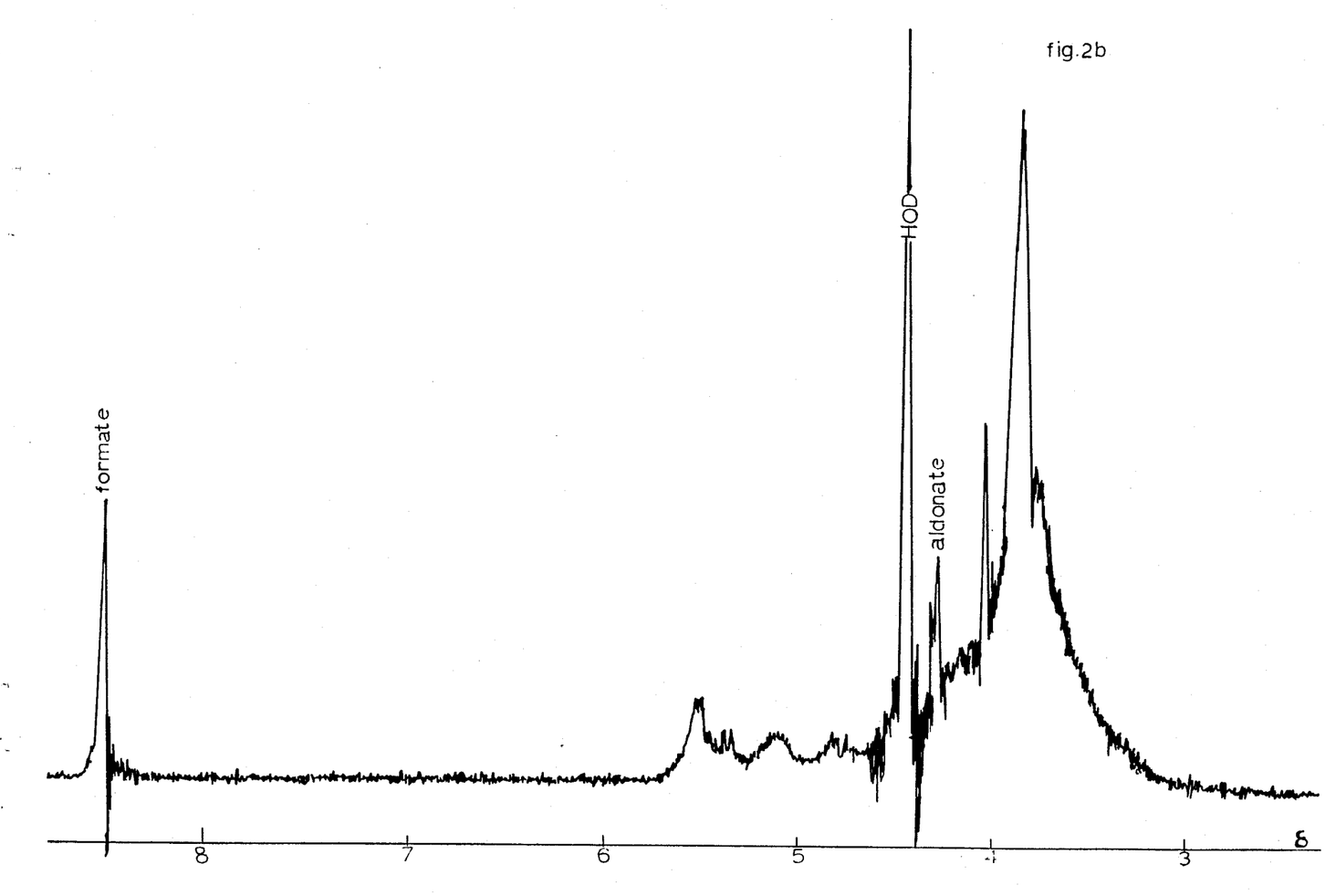

FIG. 2b shows the spectrum of the same syrup after oxidation with hypochlorite as given in Example 1 above.

The signals at 4.66 and 5.24 $\delta$ have practically disappeared; the signal at 4.22 $\delta$ is due to H $\alpha$ of aldonic acids; the doublet at 523 $\delta$ is the signal of H-1 of the nonreducing group of the aldobionic acid; the singlet at 8.48 $\delta$ is due to the formic acid.

Figure 2C:
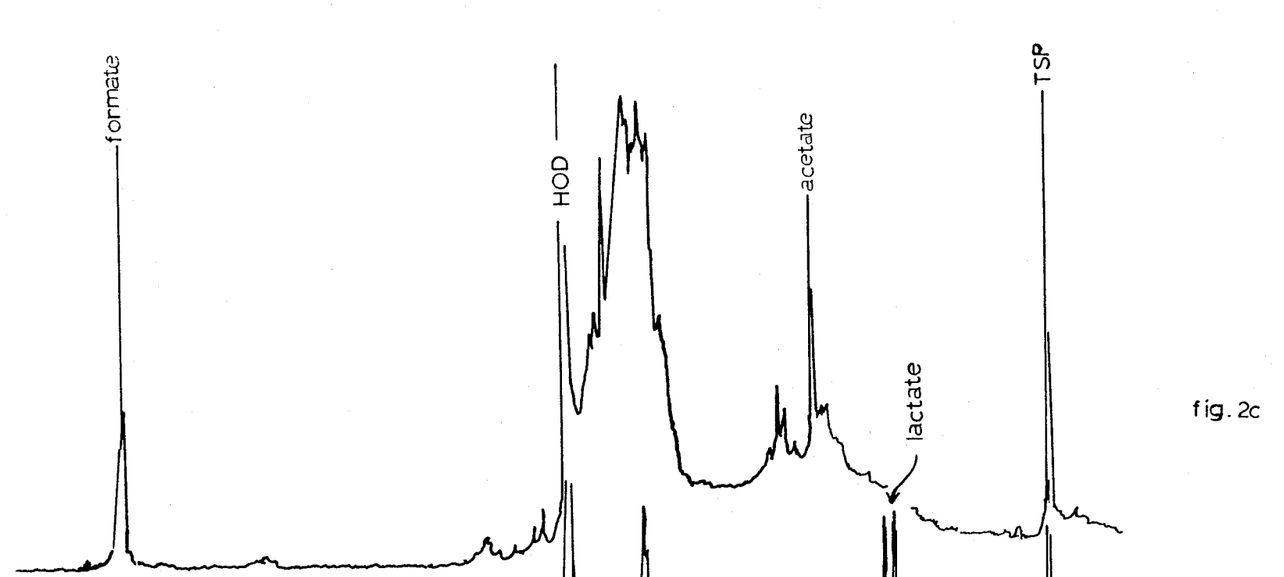
Figure 2D:
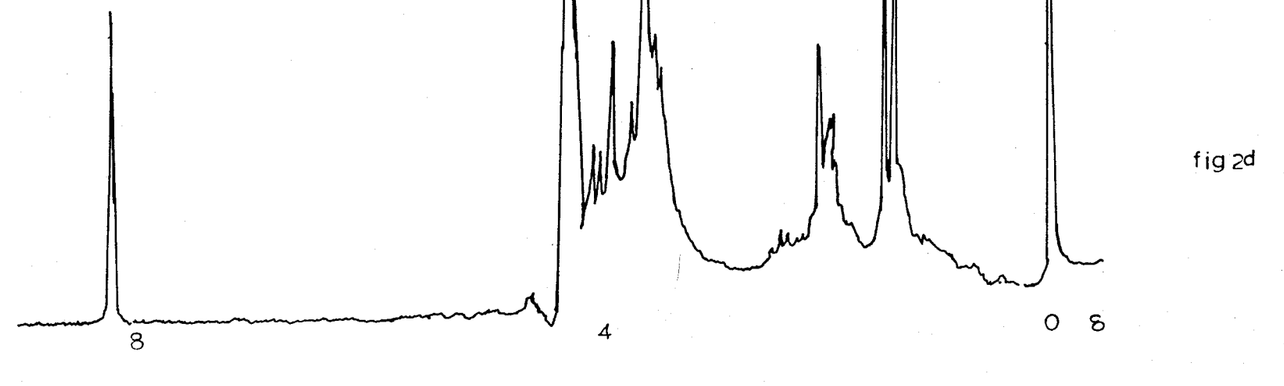

FIG. 2c shows the spectrum of the same syrup after treatment with NaOH as described in Example 4 with pH 10.5; FIG. 2d shows the spectrum of the same syrup after treatment with NaOH as described in Example 5 with pH 11.25. The analytical peaks are at 1.93 $\delta$ for the acetic acid, at 1.39 $\delta$ for the lactic acid, and at 8.48 $\delta$ for the formic acid.

The experimental procedure followed is the following: 2 ml of reaction mixture are evaporated to dryness in a rotating evaporator and redissolved in approximately 2 ml of D$_2$O (99.7%) and again evaporated. This procedure is repeated two more times for the purpose of exchanging with deuterium the greater part of the "mobile" hydrogens belonging to water and to the residual hydroxylic groups of the carbohydrates. The residue is then dissolved in 2 ml of D$_2$O (99.7%) containing 3% by weight of TSP as internal standard for anchoring the frequency to the magnetic field and 2% by weight of sodium terphthalate as internal quantitative standard.

The $^1$H—NMR spectrum of the solution is recorded at surrounding temperature in a spectrometer at 90 MHz and the signals of interest are integrated. The areas of the analytical peaks are normally calculated by dividing their value with that of the sodium terephthalate signals and the concentration of each carboxylate type is calculated with reference to calibration curves obtained using solutions of known concentration of these types in a D$_2$O solution containing 2% of sodium terephthalate.

In Tables VII to X are gathered the results of several tests performed with cement mixes containing as an additive unmodified liquid glucose syrups compared with cement mixes containing as the additive the product resulting from the process of this invention.

For all practical tests the amount of additive added to the mortar or concrete was maintained constant at 1.5°/$_{oo}$. But the amount of additive in accordance with this invention may vary within relatively broad limits depending on the type of cement to be used, surrounding conditions, and the result it is desired to reach. Ordinarily the useful amount is between 0.15°/$_{oo}$ and 4°/$_{oo}$ by weight of the cement.

TABLE VII

| Sample | Additive rate | w/c | Flow mm. | Compressive strength Kg/cm$^2$ after: | | | |
|---|---|---|---|---|---|---|---|
| | | | | 1 day | 3 days | 7 days | 28 days |
| Plain | — | 0,5 | 88 | 115 | 266 | 362 | 465 |
| D.E. 43–49 (unmodified) | 1,5°/$_{oo}$ | " | 100 | 57 | 258 | 395 | 511 |
| D.E. 36–38 (unmodified) | " | " | 101 | 57 | 262 | 412 | 528 |
| D.E. 58–60 (unmodified) | " | " | 99 | 52 | 253 | 389 | 506 |
| D.E. 36–37 (unmodified) | " | " | 102 | 42 | 258 | 408 | 535 |
| D.E. 49–53 (unmodified) | " | " | 100 | 62 | 261 | 401 | 521 |

TABLE VIII

| Sample | Addition rate | w/c | Flow mm. | Compressive strength Kg/cm$^2$ after: | | | |
|---|---|---|---|---|---|---|---|
| | | | | 1 day | 3 days | 7 days | 28 days |
| Plain | — | 0,5 | 89 | 118 | 274 | 363 | 463 |
| D.E. 43–49 OX Example 2 | 1,5°/$_{oo}$ | 0,5 | 97 | 147 | 299 | 409 | 537 |
| D.E. 36–38 OX Example 1 | " | 0,5 | 98 | 148 | 297 | 415 | 552 |
| D.E. 58–60 OX Example 3 | " | 0,5 | 97 | 145 | 296 | 402 | 523 |
| D.E. 36–37 OX Example 1 | " | 0,5 | 97 | 137 | 285 | 421 | 558 |
| D.E. 49–53 OX | " | 0,5 | 98 | 129 | 301 | 409 | 543 |

TABLE IX

| Sample | Addition rate | w/c | Flow mm. | Compressive strength Kg/cm$^2$ after: | | | |
|---|---|---|---|---|---|---|---|
| | | | | 1 day | 3 days | 7 days | 28 days |
| Plain | — | 0,5 | 92 | 109 | 245 | 355 | 459 |
| D.E. 49–53 (unmodified) | 1,5°/$_{oo}$ | " | 94 | 55 | 216 | 395 | 519 |
| D.E. 36–37 (unmodified) | " | " | 97 | 40 | 240 | 408 | 533 |
| D.E. 58–60 (unmodified) | " | " | 97 | 48 | 235 | 325 | 498 |
| D.E. 37–38 (unmodified) | " | " | 96 | 54 | 236 | 409 | 525 |
| D.E. 43–45 (unmodified) | " | " | 95 | 58 | 250 | 402 | 501 |
| D.E. 49–53 (OX) | " | " | 96 | 99 | 261 | 418 | 531 |
| D.E. 36–37 (OX) Example 4 | " | " | 92 | 93 | 271 | 419 | 543 |
| D.E. 58–60 (OX) | " | " | 98 | 99 | 268 | 403 | 508 |

TABLE IX-continued

| Sample | Addition rate | w/c | Flow mm. | Compressive strength Kg/cm² after: 1 day | 3 days | 7 days | 28 days |
|---|---|---|---|---|---|---|---|
| Example 8 D.E. 36-38 (OX) | " | " | 94 | 101 | 264 | 412 | 539 |
| Example 4 D.E. 43-45 (OX) Example 7 | " | " | 94 | 106 | 280 | 406 | 512 |

TABLE X

| Type of cement | Addition rate s/s | w/c | Slump value cm. | Curing conditions | Compressive strength Kg/cm² after: 1 day | 3 days | 7 days | 28 days |
|---|---|---|---|---|---|---|---|---|
| Portland cement | Plain | 0,59 | 5 | T°21° C. U.R. <90% | 70 | 171 | 206 | 303 |
| " | D.E. 49-53 1,5°/∞ (unmodified) | 0,555 | 4-5 | T° 21° C. U.R. <90% | 51 | 188 | 235 | 335 |
| " | D.E. 36-37 1,5°/∞ (unmodified) | " | " | | 55 | 185 | 261 | 346 |
| " | D.E. 58-60°/∞ 1,5°/∞ (unmodified) | " | " | | 52 | 179 | 270 | 335 |
| " | D.E. 36-38 1,5°/∞ (unmodified) | " | " | | 49 | 184 | 268 | 330 |
| " | D.E. 43-45 1,5°/∞ (unmodified) | " | " | | 55 | 178 | 273 | 351 |
| " | D.E. 49-53 1,5°/∞ OX | " | " | | 78 | 197 | 267 | 352 |
| " | D.E. 76-37 1,5°/∞ OX Example 1 | " | " | | 68 | 200 | 275 | 344 |
| " | D.E. 59-60 1/5°/∞ OX Example 3 | " | " | | 75 | 203 | 282 | 358 |
| " | D.E. 36-38 1,5°/∞ OX Example 1 | " | " | | 80 | 208 | 271 | 360 |
| " | D.E.43-45 1,5°/∞ OX Example 2 | " | " | | 77 | 210 | 280 | 352 |

For all practical tests with plastic mortar UNI provisions were followed (para. 2 sec. 1 art. 101) included in D.M. dated 3 June 1968 (Gazz. Uff. No. 180 dated 17/7/1968).

The cement used was a Portland cement with the following mineralogical composition according to Bogue:
$C_3S$ 46%,
$C_2S$ 27.6%,
$C_3A$ 7.4%,
$C_4AF$ 7.4%,
$CaSO_4$ 5%.
ground to a fineness of 3500 cm²/g Blaine.

TABLE XI

| Sample | Addition rate | w/c | Slump value cm. | Compressive strength Kg/cm² after: 1 day | 3 days | 7 days | 28 days |
|---|---|---|---|---|---|---|---|
| Plain | — | 0,51 | 10 | 85 | 183 | 218 | 331 |
| D.E. 36-37 unmodified | 1,5°/∞ | 0,478 | 9 | 58 | 198 | 251 | 363 |
| D.E. 58-60 unmodified | " | " | 9 | 53 | 178 | 244 | 349 |
| D.E. 43-45 unmodified | " | " | 8 | 60 | 182 | 250 | 359 |
| D.E. 36-37 OX Example 1 | " | " | 9 | 93 | 215 | 288 | 389 |
| D.E. 58-60 OX Example 3 | " | " | 11 | 88 | 211 | 279 | 380 |
| D.E. 43-45 OX Example 2 | " | " | 10 | 95 | 223 | 296 | 392 |

TABLE XI

| Sample | Addition rate | w/c | Slump value cm | Compressive strength Kg/cm² after: 3 days | 7 days | 28 days |
|---|---|---|---|---|---|---|
| Plain | — | 0,733 | 12 | 95 | 143 | 258 |
| D.E. 36-37 unmodified | 1,5°/∞ | 0,702 | 11 | 97 | 161 | 279 |
| D.E. 58-60 unmodified | " | " | 12 | 84 | 157 | 267 |
| D.E. 43-45 unmodified | " | " | 11 | 99 | 159 | 283 |
| D.E. 36-37 OX Example 1 | " | " | 13 | 121 | 178 | 297 |
| D.E. 58-60 OX Example 3 | " | " | 10 | 104 | 171 | 293 |
| D.E. 43-45 OX Example 2 | " | " | 12 | 118 | 187 | 301 |

TABLE XIII

| Sample | Addition rate | w/c | Slump value cm | Compressive strength Kg/cm² after: 3 days | 7 days | 28 days |
|---|---|---|---|---|---|---|
| Plain | — | 0,676 | 8 | 80 | 140 | 227 |

TABLE XIII-continued

| Sample | Addition rate | w/c | Slump value cm | Compressive strength Kg/cm² after: | | |
|---|---|---|---|---|---|---|
| | | | | 3 days | 7 days | 28 days |
| D.E. 36–37 unmodified | 1,5°/₀₀ | 0,648 | 8 | 87 | 168 | 259 |
| D.E. 58–60 unmodified | " | " | 8 | 80 | 154 | 263 |
| D.E. 43–45 unmodified | " | " | 9 | 91 | 166 | 248 |
| D.E. 36–37 OX Example 1 | " 295 | " | 8 | 105 | 198 | |
| D.E. 58–60 OX Example 3 | " | " | 9 | 100 | 186 | 283 |
| D.E. 43–45 OX Example 2 | " | " | 9 | 108 | 197 | 299 |

For all the practical tests on concrete were used cements of the Portland and Pozzolanic types in an amount between 380 and 400 kg/m³.

The aggregate used in these tests was distributed according to the Fuller method and used in the following proportions:

| DIAMETER mm | % BY WEIGHT |
|---|---|
| 25–10 | 33 |
| 10–7 | 10 |
| 7–3 | 22 |
| 3–0 | 35 |

We claim:

1. A process for controlled degradation of a glucose syrup comprising glucose, maltose, and maltodextrins, said process comprising the steps of providing said glucose syrup in concentrated solution in homogeneous phase and treating said glucose syrup with an oxidizer or aqueous alkaline solution to degrade the reducing groups of said glucose, maltose, and maltodextrins without substantially modifying the polysaccharidic components of maltodextrin of said syrup having a degree of polymerization greater than 3 or with only partial depolymerization of said polysaccharidic components.

2. A process of claim 1 wherein said glucose syrup has an E.D. above 30 and a maltose content above 10% (dry) and is treated with a hypohalogenite oxidizer, wherein the treatment with said oxidizer comprises adding an aqueous alkaline solution to said glucose syrup until a pH of 7.5 to 10 is reached, heating the alkalized solution to 40° C. to 60° C., adding said hypohalogenite oxidizer over a period of 1 to 3 hours holding constant the said pH of said alkalized solution within ±0.5 points, and neutralizing said solution with acid.

3. A process of claim 1 wherein said glucose syrup has an E.D. above 30 and a maltose content above 10% (dry) and is treated with said aqueous alkaline solution, wherein the treatment comprises adding said aqueous alkaline solution to said glucose syrup to bring the pH within the range of 8.5 to 11.5, heating the alkalized solution to a temperature within the range of 60° C. to 80° C., maintaining the solution within said temperature and pH ranges for 50 to 120 minutes, and neutralizing said solution with acid.

4. A process according to claims 1, 2, or 3 wherein said maltose and maltodextrins are partially hydrolyzed prior to treatment of said syrup with said oxidizer or said aqueous alkaline solution by treating said syrup at a temperature between 20° C. and 30° C. with alkali to provide the same pH used in said treatment of said syrup with said oxidizer or said aqueous alkaline solution.

5. A process of claim 2 wherein said aqueous alkaline solution is a concentrated solution of sodium hydroxide.

6. A process of claim 2 wherein said pH is between 8.5 and 9.5.

7. A process of claim 2 wherein said alkalized solution is heated to a temperature between 43° C. and 47° C.

8. A process of claim 2 wherein said hypohalogenite is hypochlorite with 10% to 15% chlorine.

9. A process of claim 2 wherein said hypohalogenite is added in a period between 1 hour 30 minutes and 2 hours 30 minutes.

10. A process of claim 3 wherein said pH is within the range of 10.25 and 10.75.

11. A process of claim 3 wherein said pH is within the range of 11.00 to 11.50.

12. A process of claim 3 wherein said alkalized solution is heated to a temperature within the range of 72° C. to 78° C.

13. A process of claim 3 wherein said alkalized solution is maintained within said temperature and pH ranges for a period of 55 to 80 minutes.

14. A degraded glucose syrup prepared in accordance with the process of claim 1.

15. An additive for mortar and concretes comprising a degraded glucose syrup prepared in accordance with claim 1.

16. Mortar or concrete containing 0.15% to 4% by weight of cement of a degraded glucose syrup prepared in accordance with claim 1.

17. A composition comprising a cement of the Portland or Pozzolanic type and, as an additive, about 0.15% to 4% by weight of said cement of a degraded glucose syrup containing a polysaccharidic maltodextrin component having a degree of polymerization greater than three and a degraded component comprising the non-reducing degradation reaction product of the glucose, maltose, and maltodextrins of said glucose syrup, wherein said degraded glucose syrup is obtained by a process comprising the steps of providing a glucose syrup containing said polysaccharidic maltodextrin component and a reducing sugar component of glucose, maltose, and maltodextrins, said syrup being provided in concentrated solution in homogeneous phase, and treating said glucose syrup with an oxidizer or aqueous alkaline solution to degrade the reducing groups of said reducing sugar component without substantially modifying said polysaccharidic maltodextrin component or with only partial depolymerization of said polysaccharidic maltodextrin component.

18. A composition of claim 17 wherein said degradation reaction product comprises a mixture of aldonates of glucose, maltose, and maltodextrins.

* * * * *